(12) United States Patent
Abu Antoun et al.

(10) Patent No.: US 12,122,027 B2
(45) Date of Patent: Oct. 22, 2024

(54) WORKING TOOL

(71) Applicant: Hilti Aktiengesellschaft, Schaan (LI)

(72) Inventors: Chafic Abu Antoun, Buchs (CH); Tilo Dittrich, Feldkirch (AT); Albert Binder, Buchs (CH); Manuel Gut, Göfis (AT); Florian Schmid, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 88 days.

(21) Appl. No.: 17/782,069

(22) PCT Filed: Dec. 10, 2020

(86) PCT No.: PCT/EP2020/085592
§ 371 (c)(1),
(2) Date: Jun. 2, 2022

(87) PCT Pub. No.: WO2021/122325
PCT Pub. Date: Jun. 24, 2021

(65) Prior Publication Data
US 2023/0008745 A1    Jan. 12, 2023

(30) Foreign Application Priority Data
Dec. 20, 2019 (EP) .................................... 19218893

(51) Int. Cl.
*B25C 1/06* (2006.01)
*B25C 1/00* (2006.01)
(Continued)

(52) U.S. Cl.
CPC ............... *B25C 1/06* (2013.01); *H02K 7/145* (2013.01); *H02K 33/16* (2013.01); *B25C 1/008* (2013.01)

(58) Field of Classification Search
CPC .................................. B25C 1/06; H02K 7/145
See application file for complete search history.

(56) References Cited

U.S. PATENT DOCUMENTS 4,480,523 A * 11/1984 Young ..................... F41B 6/006
89/8
6,830,173 B2   12/2004 Barber et al.
(Continued)

FOREIGN PATENT DOCUMENTS

CN         204425210 U     6/2015
CN         105071574 4     11/2015
(Continued)

OTHER PUBLICATIONS

International Searching Authority, International Search Report and Written Opinion in International Application No. PCT/EP2020/085592, mailed Feb. 18, 2021.

*Primary Examiner* — Daniel Jeremy Leeds
(74) *Attorney, Agent, or Firm* — Leydig, Voit & Mayer, Ltd.

(57) ABSTRACT

A tool for working a substrate, the tool having a stator and a working piston, which is intended to move relative to the stator along a working axis, also having a drive, which is intended to drive the working piston from a starting position along the working axis to the substrate, the stator having a first electrical stator contact and the working piston having a first electrical piston contact, which slides on the first electrical stator contact and is arranged on a radially outer circumference of the working piston with respect to the working axis.

18 Claims, 4 Drawing Sheets

(51) Int. Cl.
*H02K 7/14* (2006.01)
*H02K 33/16* (2006.01)

(56) References Cited

U.S. PATENT DOCUMENTS

| | | |
|---|---|---|
| 9,312,058 B2 | 4/2016 | Michaelsen et al. |
| 2003/0183670 A1 | 10/2003 | Barber et al. |
| 2009/0065226 A1 | 3/2009 | John et al. |
| 2010/0032468 A1* | 2/2010 | Gross ................. B25C 1/06 227/156 |
| 2013/0200966 A1 | 8/2013 | Michaelsen et al. |
| 2019/0326805 A1 | 10/2019 | Mecklenburg et al. |
| 2021/0060750 A1 | 3/2021 | Dittrich et al. |
| 2021/0187715 A1 | 6/2021 | Dittrich et al. |
| 2023/0012189 A1 | 1/2023 | Abu Antoun et al. |
| 2023/0018142 A1 | 1/2023 | Abu Antoun et al. |

FOREIGN PATENT DOCUMENTS

| | | |
|---|---|---|
| CN | 105305730 A | 2/2016 |
| CN | 114786876 A | 7/2022 |
| CN | 114786877 A | 7/2022 |
| DE | 202011050847 U1 | 11/2011 |
| EP | 3 578 307 A1 | 12/2019 |
| JP | H7-253296 A | 10/1995 |
| JP | H9-196597 A | 7/1997 |
| WO | WO 2018/104406 A1 | 6/2018 |
| WO | WO 2019/211264 A1 | 11/2019 |
| WO | WO 2019/233845 A1 | 12/2019 |

* cited by examiner

WORKING TOOL

CROSS-REFERENCE TO RELATED APPLICATIONS

This patent application is the U.S. National Stage of International Patent Application No. PCT/EP2020/085592, filed Dec. 10, 2020, which claims the benefit of European Patent Application No. 19218893.6, filed Dec. 20, 2019, which are each incorporated by reference.

The present invention relates to a tool, such as for example a setting tool for driving fastening elements into a substrate.

Such tools often have a working piston, which is intended to move along a working axis. The working piston is driven by a drive, which accelerates the working piston. WO 2018/104406 A1 describes a drive, which has an electrical capacitor, a squirrel-cage rotor arranged on the working piston and an excitation coil, which during rapid discharge of the capacitor is flowed through by current and generates a magnetic field that accelerates the working piston.

Setting tools usually have a receptacle for a fastening element, from which a fastening element received therein is transferred into the substrate along a working axis. For this, the working element is driven toward the fastening element along the working axis by the drive. U.S. Pat. No. 6,830,173 B2 discloses a setting tool with a drive, which has an electrical capacitor and a coil.

The object of the present invention is to provide a setting tool of the aforementioned type with which high efficiency and/or good setting quality are/is ensured.

The object is achieved with a preferably hand-held tool for working a substrate, having a stator and a working piston, which is intended to move relative to the stator along a working axis, also having a drive, which is intended to drive the working piston from a starting position along the working axis to the substrate, the stator having a first electrical stator contact and the working piston having a first electrical piston contact, which slides on the first electrical stator contact and is arranged on a radially outer circumference of the working piston with respect to the working axis.

An advantageous embodiment is characterized in that the first electrical piston contact comprises a first contact rail, the first electrical stator contact comprising a first sliding contact. An alternative embodiment is characterized in that the first electrical stator contact comprises a first contact rail, and the first electrical piston contact comprising a first sliding contact. The first sliding contact preferably comprises a contact brush or a slip ring.

An advantageous embodiment is characterized in that the stator has a second electrical stator contact and the working piston has a second electrical piston contact, which slides on the second electrical stator contact and is arranged on a radially outer circumference of the working piston with respect to the working axis. The second electrical piston contact preferably comprises a second contact rail, the second electrical stator contact comprising a second sliding contact. Alternatively, the second electrical stator contact comprises a second contact rail, the second electrical piston contact comprising a second sliding contact. The second sliding contact preferably comprises a contact brush or a slip ring.

An advantageous embodiment is characterized in that the drive has a capacitor. The drive preferably has a piston coil, which is arranged on the working piston and can be electrically connected to the capacitor by means of the first electrical stator contact and the first electrical piston contact in order during rapid discharge of the capacitor to have a current flowing through it and to generate a magnetic field which accelerates the working piston relative to the stator. The magnetic field particularly preferably repels the stator. The drive also preferably has a stator coil, which is arranged on the stator and can be electrically connected to the capacitor in order during rapid discharge of the capacitor to have a current flowing through it and to generate a magnetic field which accelerates the working piston relative to the stator. The magnetic field particularly preferably repels the stator.

The piston coil preferably has a piston coil axis and the stator coil has a stator coil axis which is oriented parallel to the piston coil axis. The stator coil axis particularly preferably coincides with the piston coil axis. The piston coil and the stator coil are particularly preferably flowed through by current in opposite directions during the rapid discharge of the capacitor in order to generate opposing magnetic fields.

An advantageous embodiment is characterized in that the stator has a recess into which the working piston plunges in the starting position, the stator coil being arranged partially or completely in the recess in the starting position of the working piston. In the starting position of the working piston, the first electrical piston contact is preferably arranged outside the recess.

An advantageous embodiment is characterized in that the first electrical piston contact is arranged radially outside an outer circumference of the piston coil with respect to the working axis. A further advantageous embodiment is characterized in that the first electrical piston contact is arranged axially in front of the piston coil and/or in front of the stator with respect to the working axis.

An advantageous embodiment is characterized in that the drive has a first spring, which loads the first stator contact toward the first piston contact or the first piston contact toward the first stator contact. A further advantageous embodiment is characterized in that the drive has a second spring, which loads the second stator contact toward the second piston contact or the second piston contact toward the second stator contact.

An advantageous embodiment is characterized in that the tool is designed as a setting tool for driving fastening elements into a substrate, having a receptacle which is intended to receive a fastening element, the working piston or the stator being intended to transfer a fastening element received in the receptacle into the substrate along the working axis, and the drive being intended to drive the working piston onto the fastening element along the working axis.

In the context of the invention, a capacitor should be understood as meaning an electrical component that stores electrical charge and the associated energy in an electrical field. In particular, a capacitor has two electrically conducting electrodes, between which the electrical field builds up when the electrodes are electrically charged differently. In the context of the invention, a fastening element should be understood as meaning for example a nail, a pin, a clamp, a clip, a stud, in particular a threaded stud, or the like.

A soft magnetic material in the context of the invention should be understood as meaning a material which has a high magnetic saturation flux density and in particular a small coercive field strength, and thus reinforces a magnetic field penetrating the material. In particular, the soft magnetic material of the stator frame and/or the piston frame has a saturation flux density of at least 1.0 T, preferably at least 1.3 T, particularly preferably at least 1.5 T. In the context of the invention, an electrically conducting material should be understood as meaning a material which has a high specific electrical conductivity, so that a magnetic field passing through the material generates eddy currents in the material. A soft magnetic and/or electrically conducting material preferably consists of a ferromagnetic material, particularly preferably a ferromagnetic metal, for example iron, cobalt, nickel, or an alloy with one or more ferromagnetic metals as the main component.

The invention is represented in a number of exemplary embodiments in the drawings, in which.

Figure 1:
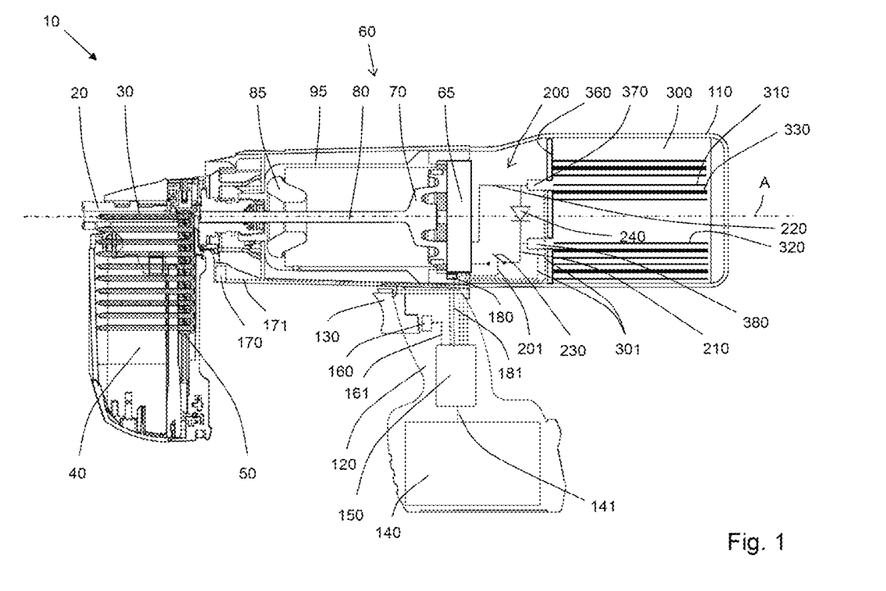
FIG. 1 shows a tool in a longitudinal section.

In FIG. 1, a tool 10 for working a substrate (not shown), which is designed as a hand-held setting tool for driving fastening elements into the substrate, is shown in a longitudinal section. The tool 10 has a receptacle 20 which is formed as a stud guide and in which a fastening element 30 formed as a nail is received in order to be driven into the substrate along a working axis A (to the left in FIG. 1). For feeding fastening elements to the receptacle, the tool 10 comprises a magazine 40 in which the fastening elements are received individually or collectively in the form of a fastening element strip 50 and are transported one by one into the receptacle 20. For this, the magazine 40 has a spring-loaded feed element, not specifically denoted.

The tool 10 has a working piston 60, which comprises a piston plate 70 and a piston rod 80. The working piston 60 is intended to transfer the fastening element 30 out of the receptacle 20 along the working axis A into the substrate. In the process, the working piston 60 is guided by its piston plate 70 in a guide cylinder 95 along the working axis A. In exemplary embodiments that are not shown, the working piston is guided along the working axis by two, three or more guide elements, for example guide rods. The working piston 60 is in turn driven by a drive 65, which comprises a switching circuit 200 and a capacitor 300. The switching circuit 200 is intended to bring about a rapid electrical discharge of the previously charged capacitor 300 and to feed the discharge current thereby flowing to the drive 65.

The tool 10 also comprises a housing 110, in which the drive 65 is received, a handle 120 with an actuating element 130 formed as a trigger, an electrical energy store 140 formed as a rechargeable battery, a control unit 150, a trigger switch 160, a contact-pressure switch 170, a temperature sensor 180 arranged on the drive 65 and electrical connecting lines 141, 161, 171, 181, 201, 301, which connect the control unit 150 to the electrical energy store 140, the trigger switch 160, the contact-pressure switch 170, the temperature sensor 180, the switching circuit 200 and the capacitor 300. In exemplary embodiments that are not shown, the tool 10 is supplied with electrical energy by means of a power cable instead of the electrical energy store 140 or in addition to the electrical energy store 140. The control unit comprises electronic components, preferably interconnected on a printed circuit board to form one or more electrical control circuits, in particular one or more microprocessors.

When the tool 10 is pressed against a substrate that is not shown (to the left in FIG. 1), a contact-pressure element, not specifically denoted, actuates the contact-pressure switch 170, which as a result transmits a contact-pressure signal to the control unit 150 by means of the connecting line 171. Triggered by this, the control unit 150 initiates a capacitor charging process in which electrical energy is conducted by means of the connecting line 141 from the electrical energy store 140 to the control unit 150 and by means of the connecting lines 301 from the control unit 150 to the capacitor 300 in order to electrically charge the capacitor 300. For this purpose, the control unit 150 comprises a switching converter, not specifically denoted, which converts the electrical current from the electrical energy store 140 into a suitable charge current for the capacitor 300. When the capacitor 300 is charged and the working piston 60 is in its ready-to-set position shown in FIG. 1, the tool 10 is in a ready-to-set state. Since the charging of the capacitor 300 is only brought about by the tool 10 pressing against the substrate, to increase the safety of bystanders a setting process is only made possible when the tool 10 is pressed against the substrate. In exemplary embodiments that are not shown, the control unit already initiates the capacitor charging process when the tool is switched on or when the tool is lifted off the substrate or when a preceding driving-in process is completed.

When the actuating element 130 is actuated, for example by being pulled using the index finger of the hand holding the handle 120, with the tool 10 in the ready-to-set state, the actuating element 130 actuates the trigger switch 160, which as a result transmits a trigger signal to the control unit 150 by means of the connecting line 161. Triggered by this, the control unit 150 initiates a capacitor discharging process, in which electrical energy stored in the capacitor 300 is conducted by means of the switching circuit 200 from the capacitor 300 to the drive 65, by the capacitor 300 being electrically discharged.

For this purpose, the switching circuit 200 schematically illustrated in FIG. 1 comprises two discharge lines 210, 220, which connect the capacitor 300 to the drive 65 and of which at least one discharge line 210 is interrupted by a normally open discharge switch 230. The switching circuit 200 with the drive 65 and the capacitor 300 may form an electrical oscillating circuit. Oscillation of this oscillating circuit back and forth and/or negative charging of the capacitor 300 may potentially have an adverse effect on efficiency of the drive 65, but can be suppressed with the aid of a free-wheeling diode 240. The discharge lines 210, 220 are electrically connected in each case to an electrode 310, 320 of the capacitor 300 arranged on a carrier film 330 by means of electrical contacts 370, 380 of the capacitor 300 arranged on an end face 360 of the capacitor 300 facing the receptacle 20, for example by soldering, welding, screwing, clamping or a form fit. The discharge switch 230 is preferably suitable for switching a discharge current with a high current intensity and is formed for example as a thyristor. In addition, the discharge lines 210, 220 are at a small distance from one another, so that a parasitic magnetic field induced by them is as low as possible. For example, the discharge lines 210, 220 are combined to form a busbar and are held together by a suitable means, for example a holder or a clip. In exemplary embodiments that are not shown, the free-wheeling diode is connected electrically in parallel with the discharge switch. In further exemplary embodiments that are not shown, no free-wheeling diode is provided in the circuit.

To initiate the capacitor discharge process, the control unit 150 closes the discharge switch 230 by means of the connecting line 201, whereby a high-intensity discharge current of the capacitor 300 flows through the drive 65, which drives the working piston 60 toward the receptacle 20 and the fastening element 30 received therein. As soon as the piston rod 80 of the working piston 60 meets a head, not denoted any more specifically, of the fastening element 30, the fastening element 30 is driven into the substrate by the working piston 60. Excess kinetic energy of the working piston 60 is absorbed by a braking element 85 of a spring-elastic and/or damping material, for example rubber or an elastomer, by the working piston 60 moving with the piston plate 70 thereof against the braking element 85 and being braked by the latter until it comes to a standstill. The working piston 60 is then reset to the ready-to-set position by a resetting device not denoted any more specifically.

Figure 2:
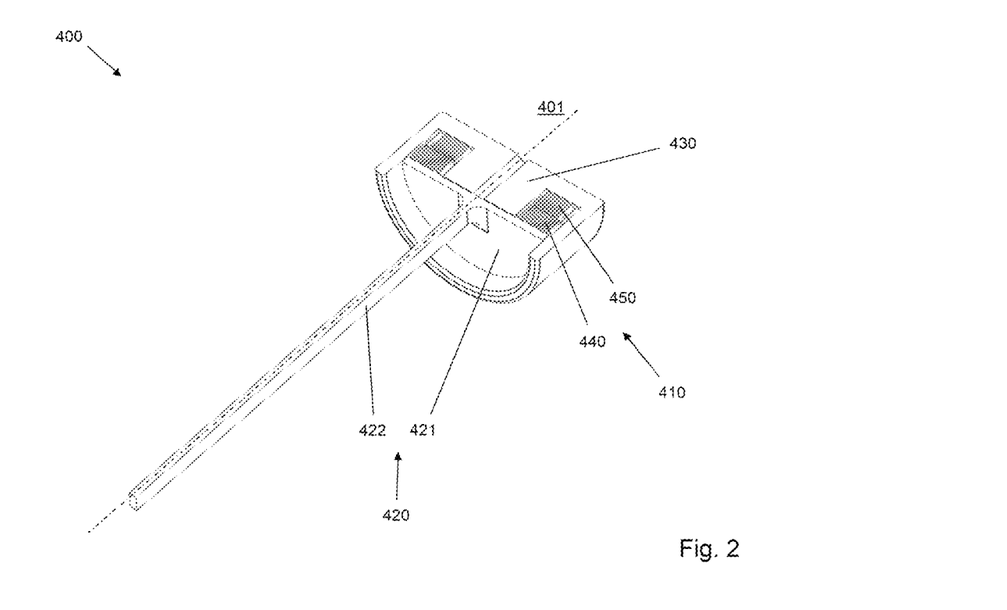
FIG. 2 shows a drive/working-piston unit of a tool.

In FIG. 2, a drive/working-piston unit 400 of a tool, for example the tool 10 shown in FIG. 1, is illustrated. The drive/working-piston unit 400 is shown cut away along a working axis 401 and comprises a partially shown drive 410, a working piston 420 and a stator 430. The working piston 420 has a piston plate 421 and a piston rod 422 and is intended to move relative to the stator 430 along the working axis 401. The drive 410 is intended to drive the working piston 420 along the working axis 401. For this purpose, the drive 410 comprises a piston coil capacitor (not shown) and a piston coil 440 arranged on the working piston 420. The piston coil 440 can be electrically connected to the piston coil capacitor in order during rapid discharge of the piston coil capacitor to be flowed through by current and to generate a magnetic field that brings about a repulsive force between the piston coil 440 and the stator 430 and accelerates the working piston 420 relative to the stator 430. The repulsive force between the piston coil 440 and the stator 430 is brought about for example by the fact that the magnetic field generated by the piston coil 440 passes through the stator 430 and induces in the stator 430 an electrical current, which in turn generates a magnetic field opposite to the magnetic field generated by the piston coil 440. For this purpose, the stator 430 consists of an electrically conducting material, for example copper, iron or an alloy thereof, which surrounds the working axis in an annular manner. In exemplary embodiments that are not shown, the stator has a frame and a ring conductor, which is arranged on the frame, preferably fastened to the frame, has high electrical conductivity and surrounds the working axis in an annular manner.

In addition, the drive 410 comprises a stator coil capacitor (not shown) and a stator coil 450 arranged on the working piston 420. The stator coil 450 can be electrically connected to the stator coil capacitor in order during rapid discharge of the piston coil capacitor to be flowed through by current and to generate a magnetic field that brings about a repulsive force between the stator coil 450 and the working piston 420 and accelerates the working piston 420 away from the stator 430. The repulsive force between the stator coil 450 and the working piston is brought about for example by the magnetic field generated by the stator coil 450 being opposite to the magnetic field generated by the piston coil 440. For this purpose, electrical current is preferably applied to the piston coil 440 and the stator coil 450 in opposite directions and overlapping in time, in particular at the same time, by the piston coil capacitor and the stator coil capacitor being discharged in a correspondingly timed and coordinated manner, for example controlled by a control unit that is not shown. The piston coil 440 and the stator coil 450 respectively have a piston coil axis and a stator coil axis, which coincide with the working axis 401 and are thus oriented parallel to one another. In order to return the working piston 420 to the starting position shown in FIG. 2, electrical current is preferably applied to the piston coil 440 and the stator coil 450 in the same direction and overlapping in time, in particular at the same time, so that the magnetic field generated by the stator coil 450 and the magnetic field generated by the piston coil 440 are in the same direction. This brings about an attractive force between the stator coil 450 and the working piston 420, and the working piston 420 is accelerated onto the stator 430.

Figure 3:
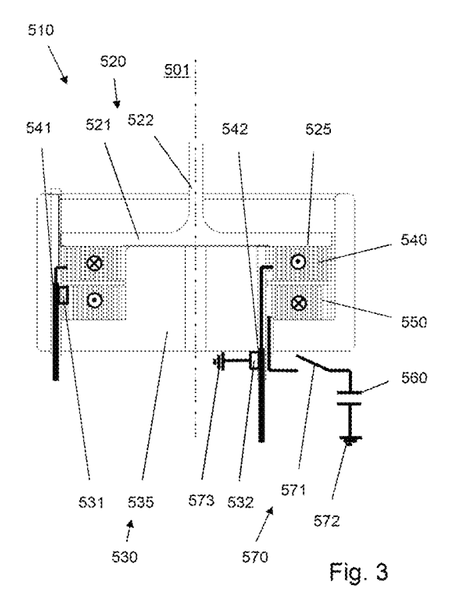
FIG. 3 shows a drive of a tool.

In FIG. 3, a drive 510 of a tool, for example the tool 10 shown in FIG. 1, is illustrated. The drive 510 is shown cut away along a working axis 501 and is intended to drive a working piston 520 with a piston plate 521 and a piston rod 522 along the working axis 501 and to move it relative to a stator 530. The drive 510 comprises a capacitor 560, a switching circuit 570 with a switch 571, a piston coil 540 arranged on the working piston 520 and a stator coil 550 arranged on the stator 530. The piston coil 540 can be electrically connected to the capacitor 560 in order during rapid discharge of the capacitor 560 to be flowed through by a current, so that the capacitor 560 represents a piston coil capacitor. A current flow through the piston coil 540 generates a first magnetic field. The stator coil 550 can also be electrically connected to the capacitor 560 in order during rapid discharge of the capacitor 560 to be flowed through by current, so that the capacitor 560 also represents a stator coil capacitor. A current flow through the stator coil 550 generates a second magnetic field.

One electrode of the capacitor 560 is electrically connected to an input of the switch 571 and can be charged with respect to a counter electrode of the capacitor 560, which is electrically connected to a first ground potential 572, for example the negative terminal of an electrical rechargeable battery or a battery. An output of the switch 571 is electrically connected, preferably permanently wired, to an input of the stator coil 550 on an inner side of the stator coil 550. An output of the stator coil 550 on an outer side of the stator coil 550 is electrically connected, preferably permanently wired, to a first electrical stator contact 531, which is formed as a contact brush and which the stator 530 has. An input of the piston coil 540 on an outer side of the piston coil 540 is electrically connected, preferably permanently wired, to a first piston contact 541, which is formed as a contact rail and which the working piston 520 has. The first piston contact 541 slides in an electrically conducting manner along the first stator contact 531 when the working piston 520 moves along the working axis 501. A first spring (not shown) loads the first stator contact 531 toward the first piston contact 541. In exemplary embodiments that are not shown, a spring additionally or alternatively loads the first piston contact toward the first stator contact.

An output of the piston coil 540 on an inner side of the piston coil 540 is electrically connected, preferably permanently wired, to a second piston contact 542, which is formed as a contact rail and which the working piston 520 has. The second piston contact 542 slides in an electrically conducting manner along a second stator contact 532 when the working piston 520 moves along the working axis 501. The stator 530 has the second stator contact 532, which is formed as a contact brush and is electrically connected to a second ground potential 573, which is preferably identical to the first ground potential 572. A second spring (not shown) loads the second stator contact 532 toward the second piston contact 542. In exemplary embodiments that are not shown, a spring additionally or alternatively loads the second piston contact toward the second stator contact. The piston contacts 541, 542 do not necessarily contact the stator contacts 531, 532 during the entire movement of the working piston. In some applications, contacting during the first 0.5 ms to 1 ms, in particular during the first 0.6 ms, is sufficient. The piston contacts 541, 542 have a length in the direction of the working axis 501 which for some areas of application is approximately 10 mm to 30 mm.

The piston contacts 541, 542 are rigidly connected to the rest of the working piston 520 and move with the rest of the working piston 520. In exemplary embodiments that are not shown, the first and/or the second stator contact is formed as a slip ring. In further exemplary embodiments that are not shown, the first and/or the second stator contact is formed as a contact rail and the first or the second piston contact is formed as a contact brush or a slip ring. The second piston contact 542 and the second stator contact 532 are arranged radially inside the stator coil 550 and the piston coil 540 with respect to the working axis 501. In exemplary embodiments that are not shown, the first piston contact and the first stator contact are additionally or alternatively arranged radially inside the stator coil and/or the piston coil.

The rapid discharge of the capacitor 560 via the piston coil 540 and the stator coil 550 can be triggered by means of the switching circuit 570, by the switch 571 being closed when the capacitor 560 is electrically charged and the piston coil 540 and the stator coil 550 being electrically connected to the capacitor 560. The electrical current then flows from the capacitor 560 through the switch 571, from the inside to the outside through the stator coil 550, through the first stator contact 531 and the first piston contact 541, from the outside to the inside through the piston coil 540 and finally through the second piston contact 542 and the second stator contact 532 to the second ground potential 573.

The piston coil 540 and the stator coil 550 respectively have a piston coil axis and a stator coil axis, which coincide with the working axis 501 and are thus oriented parallel to one another. The piston coil 540 and the stator coil 550 are wound in the same direction and the electrical current flows through them in opposite directions, so that the first magnetic field and the second magnetic field are opposite to one another. In exemplary embodiments that are not shown, the coils are wound in opposite directions and the electrical current flows through them in the same direction. This brings about a repulsive force between the stator coil 550 and the piston coil 540, and thus between the stator 530 and the working piston 520, so that the working piston 520 is accelerated relative to the stator 530. The piston coil 540 and the stator coil 550 are electrically connected in series with one another, that is to say that electrical current flows through them at the same time, a current intensity of the current flowing through the coils 540, 550 being the same for the piston coil 540 and the stator coil 550. In addition, the piston coil 540 and the stator coil 550 preferably have the same number of coil turns, so that the magnetic fields generated by the coils 540, 550 are equally strong.

The working piston 520 has a piston frame 525, which preferably consists of a soft magnetic material, such as for example iron or an alloy thereof, for example steel. The piston frame 525 surrounds the piston coil 540 and extends in a circumferential direction with respect to the working axis 501. As a result, the second magnetic field generated by the piston coil 540 is intensified in the area of the stator coil 550 and the repulsive force between the stator 530 and the working piston 520 is increased. The piston plate 521 preferably consists of the soft magnetic material and particularly preferably forms the piston frame. The piston rod 522 also preferably consists of the soft magnetic material and is particularly preferably connected in one piece to the piston plate 521, which may increase a stiffness and/or mechanical robustness of the working piston 520. The stator 530 has a stator frame 535, which preferably consists of a soft magnetic material, such as for example iron or an alloy thereof, for example steel. The stator frame 535 surrounds the stator coil 550 and extends in a circumferential direction with respect to the working axis 501. As a result, the second magnetic field generated by the stator coil 550 is intensified in the area of the piston coil 540 and the repulsive force between the stator 530 and the working piston 520 is increased.

Figure 4:
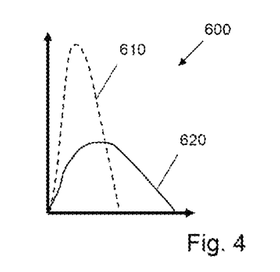
FIG. 4 shows a plot of a driving force over a time.

FIG. 4 shows a plot 600 of a drive force transmitted from a drive to a working piston over a time. A force profile 610 corresponds to a drive with a piston coil, which is arranged on the working piston and generates a magnetic field which induces an opposing magnetic field in a stator or a preferably short-circuited stator coil. A force is transmitted in a relatively short time. In order nevertheless to achieve a desired speed of the working piston, a relatively large maximum force must be transmitted. A force profile 620 corresponds to a drive with a piston coil, which is arranged on the working piston and generates a first magnetic field, and a stator coil, which is arranged on a stator and generates a second magnetic field in the opposite direction to the first magnetic field. A force is transmitted for a relatively long time. A relatively small maximum force is sufficient to achieve the desired speed of the working piston. An area under the curve of the force profile 610, 620 is a measure of an impulse of the working piston. With the same impulse and thus, assuming the same piston mass, the same speed of the working piston, that is to say also with the same kinetic energy of the working piston, the area under both curves is the same. A smaller maximum force has the advantage that a load on the drive and on a tool having the drive is reduced.

Figure 5:
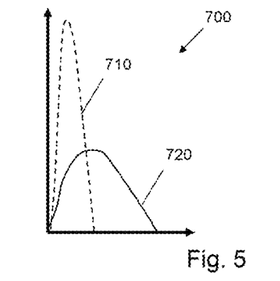
FIG. 5 shows a plot of a driving force over a distance covered by a working piston.

FIG. 5 shows a plot 700 of a drive force transmitted from a drive to a working piston over a distance covered by the working piston along a working axis. A force profile 710 corresponds to a drive with a piston coil, which is arranged on the working piston and generates a magnetic field which induces a magnetic field in opposite directions in a stator. A force is transmitted over a relatively short distance. In order nevertheless to achieve a desired kinetic energy of the working piston, a relatively large maximum force must be transmitted. A force profile 720 corresponds to a drive with a piston coil, which is arranged on the working piston and generates a first magnetic field, and a stator coil, which is arranged on a stator and generates a second magnetic field in the opposite direction to the first magnetic field. A force is transmitted over a relatively long distance. A relatively small maximum force is sufficient to achieve the desired kinetic energy of the working piston. An area under the curve of the force profile 710, 720 is a measure of the kinetic energy of the working piston. With the same kinetic energy of the working piston, the area under both curves is thus the same.

A smaller maximum force has the advantage that a load on the drive and on a tool having the drive is reduced. In addition, a maximum current strength is reduced, so that it may be that cheaper electronic components can be used for interconnecting the coils. Furthermore, electromagnetic exposure of a user of the tool is reduced, so that a light and/or inexpensive shielding may be sufficient. In addition, efficiency of the drive with a piston coil and a stator coil may be higher than that of the drive with only one coil, so that waste heat to be dissipated is also reduced. In addition, it is advantageous to switch off the current flow through the coils, for example by short-circuiting, when the transmitted force becomes very small. As a result, undesired electrical flashovers and/or sparks between the electrical contacts sliding against one another may be reduced or avoided.

Figure 6:
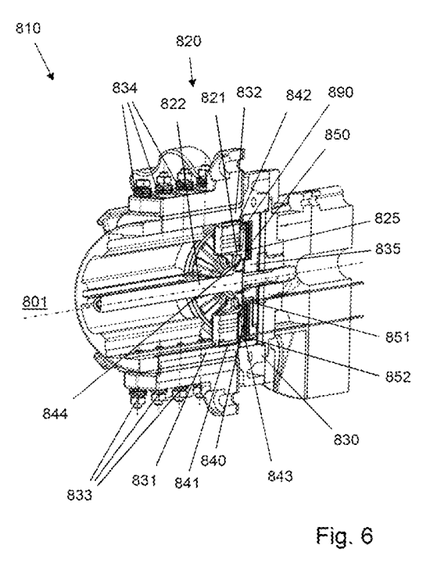
FIG. 6 shows a drive of a tool in a longitudinal section.
Figure 7:
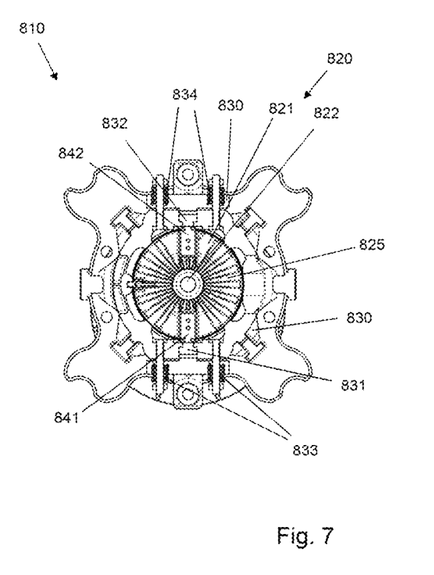
FIG. 7 shows the drive from FIG. 6 in a plan view.

In FIG. 6-7, a drive 810 of a tool, for example the tool 10 shown in FIG. 1, is illustrated. FIG. 6 shows a perspective longitudinal section along a working axis 801 and FIG. 7 shows a plan view in the direction of the working axis 801 (from the left in FIG. 6). The drive 810 is intended to drive a working piston 820 with a piston plate 821 and a piston rod 822 along the working axis 801 and to move it relative to a stator 830. The drive 810 comprises a piston coil 840 arranged on the working piston 820 and a stator coil 850 arranged on the stator 830. The piston coil 840 and the stator coil 550 can be electrically connected to a capacitor (not shown) in order to have a current flowing through them when the capacitor is rapidly discharged.

For this purpose, the stator coil 850 has an input 851 on a radially inner circumference of the stator coil 850 with respect to the working axis 801. An output 852 of the stator coil 850 on radially outer circumference of the stator coil 850 with respect to the working axis 801 is electrically connected to a first electrical stator contact 831, which is formed as a contact rail and which the stator 830 has. An input 843 of the piston coil 840 on a radially outer circumference of the piston coil 840 with respect to the working axis 801 is electrically connected to a first piston contact 841, which is formed as a contact brush and which the working piston 820 has on a radially outer circumference with respect to the working axis 801. The first electrical piston contact 841 is arranged with respect to the working axis 801 radially outside an outer circumference of the piston coil 840 and axially in front of the piston coil 840 and/or in front of the stator 830. The first piston contact 841 slides in an electrically conducting manner along the first stator contact 831 when the working piston 820 moves along the working axis 801. A number of first springs 833 load the first stator contact 831 toward the first piston contact 841.

An output 844 of the piston coil 840 on a radially inner circumference of the piston coil 840 with respect to the working axis 801 is electrically connected to a second piston contact 842, which is formed as a contact rail and which the working piston 820 has on the radially outer circumference with respect to the working axis 801. The second piston contact 842 slides in an electrically conducting manner along a second stator contact 832 when the working piston 820 moves along the working axis 801. The stator 830 has the second stator contact 832, which is formed as a contact brush and is electrically connected to a ground potential (not shown). A number of second springs 834 load the second stator contact 832 toward the second piston contact 842. The piston contacts 841, 842 contact the stator contacts 831, 832 during the entire movement of the working piston 820. The piston contacts 841, 842 are rigidly connected to the rest of the working piston 820 and move with the rest of the working piston 820.

The working piston 820 has a piston frame 825, which preferably consists of a soft magnetic material, such as for example iron or an alloy thereof, for example steel. The piston frame 825 surrounds the piston coil 840 and extends in a circumferential direction with respect to the working axis 801. The piston plate 821 preferably consists of the soft magnetic material. The stator 830 has a stator frame 835, which preferably consists of a soft magnetic material, such as for example iron or an alloy thereof, for example steel. The stator frame 835 surrounds the stator coil 850 and extends in a circumferential direction with respect to the working axis 801.

The stator 830 and the stator frame 835 have a recess 890 into which the working piston 820 plunges in the starting position shown in FIG. 6. In the starting position of the working piston 820, the stator coil 850 is arranged completely in the recess 890. In the starting position of the working piston 820 and during the entire movement of the working piston 820, the piston contacts 841, 842 are arranged outside the recess 890, preferably in front of the stator 830 in the direction of the working axis 801. The radially outer circumference of the working piston 820, on which the piston contacts 841, 842 are located, is larger than the radially outer circumference of the piston coil 840 and/or smaller than a radially outer circumference of the stator 830 or the stator frame 835 with respect to the working axis 801.

The invention has been described using a series of exemplary embodiments that are illustrated in the drawings and exemplary embodiments that are not illustrated. The individual features of the various exemplary embodiments are applicable individually or in any desired combination with one another, provided that they are not contradictory. It is pointed out that the tool according to the invention can also be used for other applications, for example as a hammer drill or the like.

The invention claimed is:

1. A tool for working a substrate, the tool having a stator and a working piston, which is intended to move relative to the stator along a working axis, a drive, which is intended to drive the working piston from a starting position along the working axis to the substrate, the stator having a first electrical stator contact and the working piston having a first electrical piston contact, which slides on the first electrical stator contact and is arranged on a radially outer circumference of the working piston with respect to the working axis, wherein the first electrical piston contact is arranged in front of the stator with respect to the working axis, and wherein the drive has a piston coil, which is arranged on the working piston and can be electrically connected to a capacitor by the first electrical stator contact and the first electrical piston contact in order during rapid discharge of the capacitor to have a current flowing through the piston coil and to generate a magnetic field which accelerates the working piston relative to the stator.

2. The tool as claimed in claim 1, wherein the stator has a second electrical stator contact and the working piston has a second electrical piston contact, which slides on the second electrical stator contact and is arranged on a radially outer circumference of the working piston with respect to the working axis.

3. The tool as claimed in claim 1, wherein the drive has a capacitor.

4. The tool as claimed in claim 1, wherein the drive has a stator coil, which is arranged on the stator and can be electrically connected to the capacitor in order during rapid discharge of the capacitor to have a current flowing through the stator coil and to generate a magnetic field which accelerates the working piston relative to the stator.

5. The tool as claimed in claim 4, wherein the piston coil has a piston coil axis and the stator coil has a stator coil axis, which is oriented parallel to the piston coil axis.

6. The tool as claimed in claim 5, wherein the piston coil and the stator coil are flowed through by current in opposite directions during the rapid discharge of the capacitor in order to generate opposing magnetic fields.

7. The tool as claimed in claim 1, wherein the stator has a recess into which the working piston plunges in the starting position, the piston coil being arranged partially or completely in the recess in the starting position of the working piston.

8. The tool as claimed in claim 7, wherein, in the starting position of the working piston, the first electrical piston contact is arranged outside the recess.

9. The tool as claimed in claim 1, wherein the first electrical piston contact is arranged radially outside an outer circumference of the piston coil with respect to the working axis.

10. The tool as claimed in claim 1, wherein the drive has a first spring, which loads the first electrical stator contact toward the first electrical piston contact or the first piston electrical contact toward the first electrical stator contact.

11. The tool as claimed in claim 2, wherein the drive has a second spring, which loads the second electrical stator contact toward the second electrical piston contact or the second electrical piston contact toward the second electrical stator contact.

12. The tool as claimed in claim 1, having a receptacle which is intended to receive a fastening element, the working piston or the stator being intended to transfer a fastening element received in the receptacle into the substrate along the working axis.

13. The tool of claim 1, wherein the piston coil generates a magnetic field that repels the stator.

14. The tool of claim 4, wherein the stator coil generates a magnetic field that repels the working piston.

15. The tool of claim 5, wherein the stator coil axis coincides with the piston coil axis.

16. The tool as claimed in claim 2, wherein the drive has a capacitor.

17. The tool as claimed in claim 2, wherein the drive has a piston coil, which is arranged on the working piston and can be electrically connected to the capacitor by the first electrical stator contact and the first electrical piston contact in order during rapid discharge of the capacitor to have a current flowing through the piston coil and to generate a magnetic field which accelerates the working piston relative to the stator.

18. The tool as claimed in claim 2, wherein the drive has a stator coil, which is arranged on the stator and can be electrically connected to the capacitor in order during rapid discharge of the capacitor to have a current flowing through the stator coil and to generate a magnetic field which accelerates the working piston relative to the stator.

* * * * *

UNITED STATES PATENT AND TRADEMARK OFFICE
CERTIFICATE OF CORRECTION

Page 1 of 1

PATENT NO.        : 12,122,027 B2
APPLICATION NO.   : 17/782069
DATED             : October 22, 2024
INVENTOR(S)       : Chafic Abu Antoun et al.

It is certified that error appears in the above-identified patent and that said Letters Patent is hereby corrected as shown below:

On the Title Page (72) Inventors:
The correct inventors are, in order, -- Chafic ABU ANTOUN, Buchs (CH); Tilo DITTRICH, Feldkirch (AT); Albert BINDER, Buchs (CH); Manuel GUT, Göfis (AT); Florian SCHMID, Buchs SG (CH); Arno MECKLENBURG, Berlin (DE) --

Signed and Sealed this
Fifteenth Day of July, 2025

Coke Morgan Stewart
*Acting Director of the United States Patent and Trademark Office*